(12) United States Patent
Xie

(10) Patent No.: US 8,635,336 B2
(45) Date of Patent: *Jan. 21, 2014

(54) SYSTEMS AND METHODS FOR CATEGORIZING NETWORK TRAFFIC CONTENT

(75) Inventor: Michael Xie, Palo Alto, CA (US)

(73) Assignee: Fortinet, Inc., Sunnyvale, CA (US)

( * ) Notice: Subject to any disclaimer, the term of this patent is extended or adjusted under 35 U.S.C. 154(b) by 249 days.

This patent is subject to a terminal disclaimer.

(21) Appl. No.: 13/153,889

(22) Filed: Jun. 6, 2011

(65) Prior Publication Data

US 2011/0231402 A1   Sep. 22, 2011

Related U.S. Application Data

(63) Continuation of application No. 12/403,996, filed on Mar. 13, 2009, now Pat. No. 7,979,543, which is a continuation of application No. 10/993,629, filed on Nov. 19, 2004, now Pat. No. 7,565,445.

(60) Provisional application No. 60/580,841, filed on Jun. 18, 2004.

(51) Int. Cl.
 *G06F 15/173* (2006.01)

(52) U.S. Cl.
 USPC ............ 709/224; 709/203; 709/217; 709/223

(58) Field of Classification Search
 USPC .................................. 709/203, 217, 223, 224
 See application file for complete search history.

(56) References Cited

U.S. PATENT DOCUMENTS

| | | | |
|---|---|---|---|
| 5,704,017 A * | 12/1997 | Heckerman et al. | 706/12 |
| 5,933,827 A * | 8/1999 | Cole et al. | 1/1 |
| 5,999,975 A * | 12/1999 | Kittaka et al. | 709/224 |
| 6,161,130 A | 12/2000 | Horvitz et al. | |
| 6,460,036 B1 | 10/2002 | Herz | |
| 6,981,040 B1 * | 12/2005 | Konig et al. | 709/224 |
| 7,089,241 B1 | 8/2006 | Alspector et al. | |
| 7,158,986 B1 | 1/2007 | Oliver et al. | |
| 7,219,148 B2 | 5/2007 | Rounthwaite et al. | |
| 7,246,150 B1 | 7/2007 | Donoho et al. | |
| 7,277,926 B1 | 10/2007 | Lee | |

(Continued)

OTHER PUBLICATIONS

"U.S. Appl. No. 10/993,629, Advisory Action mailed Oct. 17, 2008", 3 pgs.

(Continued)

*Primary Examiner* — Phouc Nguyen
(74) *Attorney, Agent, or Firm* — Schwegman Lundberg & Woessner, P.A.

(57) ABSTRACT

A method for categorizing network traffic content includes determining a first characterization of the network traffic content determining a first probability of accuracy associated with the first characterization, and categorizing the network traffic content based at least in part on the first characterization and the first probability of accuracy. A method for use in a process to categorize network traffic content includes obtaining a plurality of data, each of the plurality of data representing a probability of accuracy of a characterization of network traffic content, and associating each of the plurality of data with a technique for characterizing network traffic content. A method for categorizing network traffic content includes determining a characterization of the network traffic content, determining a weight value associated with the characterization, and categorizing network traffic content based at least in part on the characterization of the network traffic content and the weight value.

18 Claims, 5 Drawing Sheets

(56) References Cited

U.S. PATENT DOCUMENTS

| | | | |
|---|---|---|---|
| 7,421,498 | B2 | 9/2008 | Packer |
| 7,565,445 | B2 | 7/2009 | Xie |
| 2002/0032772 | A1 | 3/2002 | Olstad et al. |
| 2002/0178223 | A1 | 11/2002 | Bushkin |
| 2003/0172163 | A1 | 9/2003 | Fujita et al. |
| 2004/0030741 | A1 | 2/2004 | Wolton et al. |
| 2005/0071741 | A1 | 3/2005 | Acharya et al. |
| 2005/0091321 | A1 | 4/2005 | Daniell et al. |
| 2006/0036728 | A1 | 2/2006 | Xie |
| 2006/0168006 | A1 | 7/2006 | Shannon et al. |
| 2009/0177754 | A1 | 7/2009 | Brezina et al. |
| 2009/0234879 | A1 | 9/2009 | Xie |

OTHER PUBLICATIONS

"U.S. Appl. No. 10/993,629, Final Office Action mailed Jun. 11, 2008", 10 pgs.

"U.S. Appl. No. 10/993,629, Non Final Office Action mailed Dec. 13, 2007", 11 pgs.

"U.S. Appl. No. 10/993,629, Notice of Allowance mailed Jan. 26, 2009", 6 pgs.

"U.S. Appl. No. 10/993,629, Response filed Mar. 13, 2008 to Non Final Office Action mailed Dec. 13, 2007", 21 pgs.

"U.S. Appl. No. 10/993,629, Response filed Sep. 11, 2008 to Final Office Action mailed Jun. 11, 2008", 16 pgs.

"U.S. Appl. No. 10/993,629, Response filed Nov. 13, 2008 to Advisory Action mailed Oct. 17, 2008", 21 pgs.

"U.S. Appl. No. 10/993,629, Supplemental Notice of Allowability mailed Sep. 21, 2009", 17 pgs.

"U.S. Appl. No. 12/403,996, Final Office Action mailed May 14, 2010", 8 pgs.

"U.S. Appl. No. 12/403,996, Non-Final Office Action mailed Oct. 6, 2009", 10 pgs.

"U.S. Appl. No. 12/403,996, Notice of Allowance mailed Mar. 8, 2011", 12 pgs.

"U.S. Appl. No. 12/403,996, Response filed Feb. 8, 2010 to Non Final Office Action mailed Oct. 6, 2009", 9 pgs.

"U.S. Appl. No. 12/403,996, Response filed Jan. 3, 2011 to Final Office Action mailed May 14, 2010", 9 pgs.

* cited by examiner

| TESTS | ACCURACY | CONTENT CHARACTERIZATION |
|---|---|---|
| ILA | 10% | PORNO |
| ELA | 20% | EDUCATIONAL |
| MTA | 40% | PORNO |
| TKA | 30% | NEWS |

SYSTEMS AND METHODS FOR CATEGORIZING NETWORK TRAFFIC CONTENT

RELATED APPLICATION DATA

This application is a Continuation of U.S. application Ser. No. 12/403,996, filed on Mar. 13, 2009, which is a Continuation of and claims priority to U.S. application Ser. No. 10/993,629, filed on Nov. 19, 2004, issued on Jul. 21, 2009 as U.S. Pat. No. 7,565,445, which claims priority to U.S. Provisional Application No. 60/580,841, filed Jun. 18, 2004, which applications are expressly incorporated by reference herein in their entirety.

BACKGROUND

The field of the invention relates to computer systems and computer networks, and more particularly, to systems and methods for categorizing content of computer and network traffic.

Many organizations face the challenge of dealing with inappropriate content, such as email spam, misuse of networks in the form of browsing or downloading inappropriate content, and use of the network for non-productive tasks. Many organizations are struggling to control access to appropriate content without unduly restricting access to legitimate material and services. Currently, a common solution for blocking unwanted Web activity is to block access to a list of banned or blacklisted websites and pages based on their URLs. However, such approach may be unnecessarily restrictive, preventing access to valid content in websites that may contain only a limited amount of undesirable material. Also, the list of blocked URLs requires constant updating.

Many email spam elimination systems also use blacklists to eliminate unwanted email messages. These systems match incoming email messages against a list of mail servers that have been pre-identified to be spam hosts, and prevent user access of messages from these servers. However, spammers often launch email spam from different hosts every time, making it difficult to maintain a list of spam servers.

It would be desirable to categorize network traffic content, and prevent undesirable network traffic content (e.g., content that belongs to an undesirable category) to be passed to users. Currently, many content detecting systems use human based categorization to categorize network content. In such systems, an operator manually analyzes network content, then uses the results of the analysis to categorize the network content. Although such techniques may produce reliable results, they are labor intensive and time consuming.

In another technique, HTML links are analyzed to determine a characteristic of network content. However, such technique may erroneously mischaracterize network content. Companies have also used other techniques for characterizing network content, but each of these techniques may not produce reliable result.

Accordingly, new systems and methods for categorizing content of computer and network traffic would be useful.

SUMMARY

In accordance with some embodiments, a method for categorizing network traffic content includes determining a first characterization of the network traffic content, determining a first probability of accuracy associated with the first characterization, and categorizing the network traffic content based at least in part on the first characterization and the first probability of accuracy.

In accordance with other embodiments, a computer product includes a computer-readable medium, the computer-readable medium having a set of stored instructions, an execution of which causes a process to be performed, the process comprising determining a first characterization of the network traffic content, determining a first probability of accuracy associated with the first characterization, and categorizing the network traffic content based at least in part on the first characterization and the first probability of accuracy.

In accordance with other embodiments, a device for categorizing network traffic content includes means for determining a first characterization of the network traffic content, means for determining a first probability of accuracy associated with the first characterization, and means for categorizing the network traffic content based at least in part on the first characterization and the first probability of accuracy.

In accordance with other embodiments, a method for use in a process to categorize network traffic content includes obtaining a plurality of data, each of the plurality of data representing a probability of accuracy of a characterization of network traffic content, and associating each of the plurality of data with a technique for characterizing network traffic content.

In accordance with other embodiments, a computer product includes a computer-readable medium, the computer-readable medium having a set of stored instructions, an execution of which causes a process to be performed, the process comprising obtaining a plurality of data, each of the plurality of data representing a probability of accuracy of a characterization of network traffic content, and associating each of the plurality of data with a technique for characterizing network traffic content.

In accordance with other embodiments, a device for categorizing network traffic content includes means for obtaining a plurality of data, each of the plurality of data representing a probability of accuracy of a characterization of network traffic content, and means for associating each of the plurality of data with a technique for characterizing network traffic content.

In accordance with other embodiments, a method for categorizing network traffic content includes determining a characterization of the network traffic content, determining a weight value associated with the characterization, and categorizing network traffic content based at least in part on the characterization of the network traffic content and the weight value.

In accordance with other embodiments, a computer product includes a computer-readable medium, the computer-readable medium having a set of stored instructions, an execution of which causes a process to be performed, the process comprising determining a characterization of the network traffic content, determining a weight value associated with the characterization, and categorizing network traffic content based at least in part on the characterization of the network traffic content and the weight value.

In accordance with other embodiments, a device for categorizing network traffic content includes means for determining a characterization of the network traffic content, means for determining a weight value associated with the characterization, and means for categorizing network traffic content based at least in part on the characterization of the network traffic content and the weight value.

In accordance with other embodiments, a method for categorizing network traffic content includes determining a first characterization of the network traffic content, determining a first probability of accuracy associated with the first characterization, determining a second characterization of the network traffic content using a second technique, wherein the second technique is different from the first technique, determining a second probability of accuracy associated with the second characterization, and categorizing the network traffic content based at least in part on the first characterization, the second characterization, the first probability of accuracy, and the second probability of accuracy.

In accordance with other embodiments, a system for categorizing network traffic content includes means for determining a first characterization of the network traffic content, means for determining a first probability of accuracy associated with the first characterization, means for determining a second characterization of the network traffic content using a second technique, wherein the second technique is different from the first technique, means for determining a second probability of accuracy associated with the second characterization, and means for categorizing the network traffic content based at least in part on the first characterization, the second characterization, the first probability of accuracy, and the second probability of accuracy.

In accordance with other embodiments, a computer product includes a computer-readable medium, the computer-readable medium having a set of stored instructions, an execution of which causes a process to be performed, the process comprising determining a first characterization of the network traffic content, determining a first probability of accuracy associated with the first characterization, determining a second characterization of the network traffic content using a second technique, wherein the second technique is different from the first technique, determining a second probability of accuracy associated with the second characterization, and categorizing the network traffic content based at least in part on the first characterization, the second characterization, the first probability of accuracy, and the second probability of accuracy.

Other aspects and features will be evident from reading the following detailed description of the preferred embodiments, which are intended to illustrate, not limit, the invention.

BRIEF DESCRIPTION OF THE DRAWINGS

The drawings illustrate the design and utility of various embodiments, in which similar elements are referred to by common reference numerals. More particular descriptions will be rendered by reference to specific embodiments, which are illustrated in the accompanying drawings. Understanding that these drawings are not to be considered limiting in scope, the embodiments will be described and explained with additional specificity and detail through the use of the accompanying figures.

DETAILED DESCRIPTION

Figure 1:
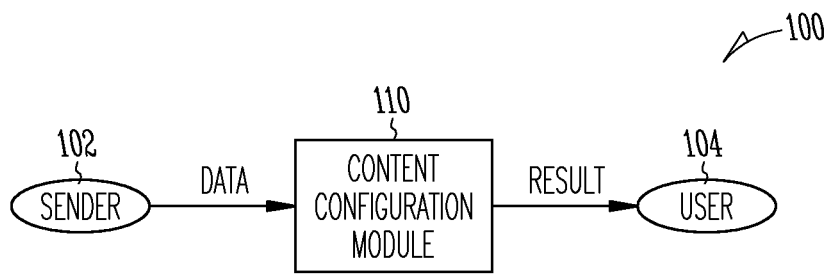
FIG. 1 illustrates a block diagram representing a system that includes a module for categorizing network traffic content in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of specific embodiments, and are not intended as an exhaustive description of the invention, or as a limitation on the scope of the invention. In addition, an illustrated embodiment need not have all the aspects or advantages of the invention shown. An aspect or an advantage described in conjunction with a particular embodiment is not necessarily limited to that embodiment and can be practiced in any other embodiments even if not so illustrated.

FIG. 1 illustrates a block diagram of a system 100, which includes a content categorization module 110 for categorizing network traffic content in accordance with some embodiments. Sender 102 transmits data associated with network traffic content, such as email content or Web content, to module 110. Module 110 receives the transmitted data, determines a category to which the network traffic content belongs (e.g., categorize the network traffic content), and causes a result, such as a message, to be sent to a user 104. The message sent to user 104 notifies the user 104 that a content belonging to a category has been detected. As used in this specification, the term "user" should not be limited to a human user, and can include a server or other types of devices that can receive information. Also, as used in this specification, the term "sender" should not be limited to a human sender, and can include a server or other types of devices that can transmit information.

In some embodiments, module 110 can be implemented using software. For example, module 110 can be implemented using software that is loaded onto a user's computer, a server, or other types of memory, such as a disk or a CD-ROM. In some cases, module 110 can be implemented as Web applications. In alternative embodiments, module 110 can be implemented using hardware. For example, in some embodiments, module 110 includes an application-specific integrated circuit (ASIC), such as a semi-custom ASIC processor or a programmable ASIC processor. ASICs, such as those described in Application-Specific Integrated Circuits by Michael J. S. Smith, Addison-Wesley Pub Co. (1st Edition, June 1997), are well known in the art of circuit design, and therefore will not be described in further detail herein. In other embodiments, module 110 can also be any of a variety of circuits or devices that are capable of performing the functions described herein. For example, in alternative embodiments, module 110 can include a general purpose processor, such as a Pentium processor. In other embodiments, module 110 can be implemented using a combination of software and hardware. In some embodiments, module 110 may be implemented as a firewall, a component of a firewall, or a component that is configured to be coupled to a firewall.

Figure 2:
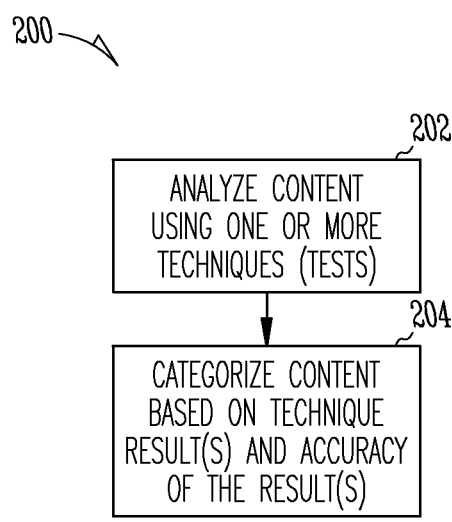
FIG. 2 illustrates a method for categorizing network traffic content in accordance with some embodiments.

FIG. 2 illustrates a method 200 for categorizing network traffic content in accordance with some embodiments. First, module 110 receives data associated with network traffic content and analyzes the content using one or more techniques (Step 202). The techniques used will depend on the type of content being analyzed. For the purpose of the following discussion, it is assumed that the content being analyzed is Web-related content. However, it should be understood by those skilled in the art that the process 200 of FIG. 2 can be used to categorize other types of content.

The illustrated embodiments use four representative techniques (which may be tests) to independently analyze and characterize the Web-related content. The first representative technique involves performing an Internal Link Analysis (ILA). ILA is based on the theory that a website may have HTML links to other sites with similar characteristics. In such cases, module 110 includes an ILA engine for analyzing HTML links within an URL (with predefined depth–number of layers of sub-page). Using such technique, if the majority of links associated with the Web content points to a URL associated with a certain characterization (e.g., educational, advertising, etc.), the Web content is determined (characterized) as having such characterization. The number of available characterizations associated with the ILA technique can vary. For example, in some embodiments, four possible characterizations (reference characterizations) can be made available: educational, advertising, porno, and news.

The second representative technique involves performing an External Link Analysis (ELA). ELA is based on the theory that if most people consider a website as having a certain characterization (e.g., educational, advertising, etc.), the website is then determined to have such characterization. In such cases, a database is maintained (e.g., within module 10 or in a separate memory) that points to a number of prescribed external portal sites that have some categorization of URLs. The portal list is constantly updated and maintained. The portal list can be stored in module 10 or in a separate memory that is coupled to module 10.

The third representative technique involves performing a Meta-Tag Analysis (MTA). MTA is based on the theory that if a majority or a substantial number of meta-tags are associated with a certain characterization (e.g., educational, advertising, etc.), the website is determined as having such characterization. In such cases, module 110 analyzes HTML content and determines if it contains any meta-tags indicating which characterization the content belongs to. For example, if a majority or a substantial number of meta-tags are associated with a certain characterization, module 110 then determines the content as having such characterization.

The fourth representative technique involves performing a Token Analysis (TKA). TKA is based on the theory that if content contains a large number of words having the same attribute, then the content is characterized as having the attribute. In such cases, a database of words and phrases is maintained (e.g., in module 110 or in a separate memory). The words and phrases are abstracted to tokens, which can be used by module 110 to analyze a HTML file's content and determine a characterization for the content. For example, if the content being analyzed contains a plurality of texts, the content can first be normalized to make it more "standard" for processing. Normalization of content, can be performed by, for example, converting all letters to upper case, and replacement of all white space characters and punctuation marks with one character (such as a single white space). Next, the database of words may be accessed. In such a database, words are represented by numbers, and each number is associated with one or more attribute. Since every word is represented by a number, module 110 can perform counting, and determines the frequency that these words appear in the content. If the content contains a large number of words having the same attribute (e.g., educational, pornographic, etc.), then the content is determined as having the attribute (characterization). It should be noted that instead of using TKA to analyze text, in other embodiments, TKA can be implemented to analyze graphic(s), or combination of text and graphic(s).

Although four representative techniques for characterizing network traffic content have been described, the scope of the invention should not be so limited. In other embodiments, instead of using four techniques, module 110 can use a different number of techniques to analyze network traffic content. Also, in other embodiments, instead of the four techniques described previously, module 110 can employ different techniques (e.g., variations of the previously described techniques) or different combination of techniques to analyze network traffic content of various types.

After network traffic content has been analyzed and characterized, module 110 determines a category to which the content belongs (i.e., categorizes the content) based on the characterization by the four representative techniques (Step 204). In the illustrated embodiments, the category is determined by associating each technique with an accuracy. The accuracy associated with each technique represents the accuracy of the characterization determined by the technique.

Figures 3, 4:
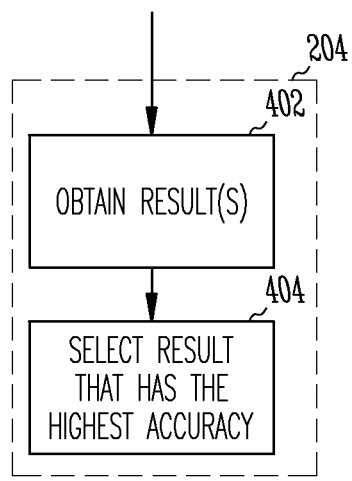
FIG. 3 illustrates ~n example of results obtained using different techniques for characterizing network traffic content in accordance with some embodiments.
FIG. 4 illustrates a method for categorizing network traffic content using an accuracy of a technique result in accordance with some embodiments.

FIG. 3 illustrates an example of results provided by the four representative techniques to characterize a website content. In the example, ILA characterizes the website content as "Porno," ELA characterizes the website content as "Educational," MTA characterizes the website content as "Porno," and TKA characterizes the website content as "News." These characterizations are merely illustrative and could be any of a number of other characterizations. Accuracies of the technique results for the respective four representative techniques are also provided. In the illustrated example, the results provided by the ILA, ELA, MTA, and TKA have a 10% accuracy (i.e., a 10% probability that the result is accurate), a 20% accuracy, a 40% accuracy, and a 30% accuracy, respectively.

In some embodiments, module 110 is configured to determine the accuracies associated with different techniques by receiving the accuracies as inputs. For examples, a user can manually input the accuracies into the module 110, or alternatively, the accuracies can be transmitted to the module 110 via a communication link. Alternatively, module 110 can be configured to calculate the accuracies.

Various methods can be employed to determine the accuracy (or probability of accuracy). In the illustrated embodiments, the accuracy can be determined by performing statistical analysis for each of the four techniques. For example, results provided by ILA can be compared with results provided by human categorization (i.e., categorization performed manually), and be analyzed to determine how accurate they are. Such analysis can be carried out for each of the available reference characterizations for each technique. For example, if ILA includes four possible reference characterizations (e.g., Porno, Educational, News, and Advertisement), then statistical analysis can be performed for each of the four reference characterizations to determine how accurate of a result the ILA can provide with respect to each reference characterization. If it is determined from the statistical analysis that ILA provides "Porno" characterization with 10% accuracy, "Educational" characterization with 30% accuracy, "News" characterization with 20% accuracy, and "Advertisement" characterization with 40% accuracy, then every time ILA characterizes network traffic content as "Porno," "Educational," "New," or "Advertisement," a 10%, 30%, 20%, or 40% will be assigned to the result of characterization, respectively. As such, the accuracy (as expressed in probability value) can be characterization-specific for each of the techniques used.

In other embodiments, accuracies for the categories associated with one technique (e.g., ILA) can be processed to determine an average accuracy for the technique. In such cases, the same average accuracy associated with a technique is used for all possible characterizations for the technique. Using this technique for the above example, a 25% (=(10%+30%+20%+40%)/4) accuracy will be associated with results provided by the ILA, regardless of the characterization determined by the ILA.

Although accuracy of a technique has been described as a percentage of probability, in other embodiments, accuracy of a technique can be represented by other variables. For example, in alternative embodiments, a weight value representing an accuracy of a result can be associated with each of the techniques used to analyze network traffic content. In such cases, the weight value can be determined based on probability studies of results of the techniques, as similarly discussed previously. In some embodiments, a weight of 0 value can be used to associate results of a technique when a probability study indicates that such technique has an accuracy below a prescribed threshold (e.g., 10%), and a weight having a value of 2 can be used to associate result of a technique when a probability study indicates that such technique has an accuracy above a prescribed threshold (e.g., 50%).

Various techniques can be used to categorize network traffic content based on accuracies of the results provided.

FIG. 4 illustrates a technique for categorizing network traffic content in accordance with some embodiments. As shown in FIG. 4, the step 204 of categorizing content includes obtaining technique result(s) from step 202 (Step 402), and selecting the result that has the highest accuracy (Step 404). For example, module 110 can be configured or programmed to search for an accuracy that has the highest value, and select the result associated with the highest accuracy for categorizing network traffic content. Using such technique for the above example, module 110 will categorize the content as "Porno" based on the result of the MTA because the MTA characterizes the content as "Porno" and has the highest degree of accuracy (i.e., 40%).

Figure 5:
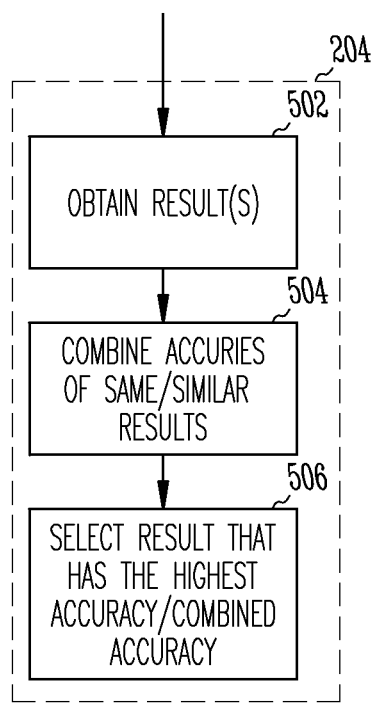
FIG. 5 illustrates a method for categorizing network traffic content using an accuracy of a technique result in accordance with other embodiments.

FIG. 5 illustrates another technique for categorizing network traffic content in accordance with other embodiments. As shown in FIG. 5, the step 204 of categorizing content includes obtaining technique result(s) from step 202 (Step 502), and combining accuracies of two or more characterizations if the characterizations yield the same (or similar) result (Step 504). Using such technique for the above example, module 110 adds the probabilities of accuracy for the ILA and MTA (because these two analysis characterize the network traffic content as "Porno"), thereby producing a combined accuracy of 50% (=10%+40%). The combined accuracy for the characterization is then compared with other accuracies or other combined accuracies for other characterizations, and the characterization associated with the maximum accuracy (or combined accuracy) is then selected to categorize the content (Step 506). Following the above example, the combined accuracy=50% for the "Porno" characterization is compared with the accuracies for the "News" characterization (=30%) and the "Educational" characterization (=10%). Because the "Porno" characterization has the maximum accuracy (=50%), module 110 categorizes the network traffic content as "Porno" based on the combined results provided by the ILA and MTA.

In other embodiments, the module 110 is configured to determine whether an accuracy associated with a result is below or above a prescribed threshold (e.g., by performing a comparison between the accuracy and the prescribed threshold). In such cases, if the accuracy for a technique (e.g., ILA) is below the prescribed threshold, the module 110 then disregards the result provided by the technique. On the other hand, if the accuracy for a technique is above the prescribed threshold, the module 110 then accounts for the result provided by the technique in the content categorization process.

Other algorithms for categorizing network traffic content based on accuracy of technique used can also be employed in other embodiments. For example, in alternative embodiments, the accuracy values can be further processed (e.g., multiplied by one or more weight values), and the processed values are then used to categorize network traffic content.

Figure 6:
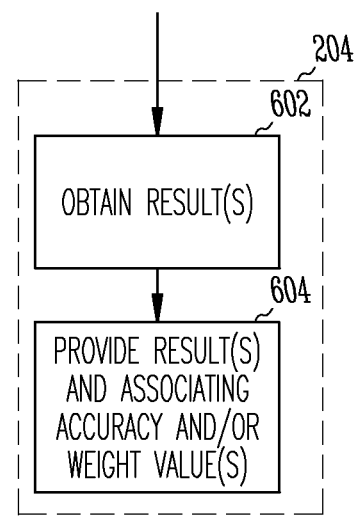
FIG. 6 illustrates a method for categorizing network traffic content using an accuracy of a technique result in accordance with other embodiments.

FIG. 6 illustrates a further technique for categorizing network traffic content in accordance with other embodiments, which does not involve performing an algorithm to categorize network traffic content. As shown in FIG. 6, the step 204 of categorizing content includes obtaining technique result(s) from step 202 (Step 602), and presenting result(s) of characterization by one or more techniques (e.g., ILA) in conjunction with a variable that is associated with an accuracy or quality of the result (Step 604) (FIG. 6). For example, in some embodiments, module 110 categorizes network traffic content by providing a message to user 104, wherein the message includes information, such as those shown in FIG. 3. In such cases, module 110 does not summarily place the content in a category, but allows user 104 to draw his/her conclusion based on the information presented.

It should be noted that although several methods for categorization network traffic content have been described with reference to accuracies for various techniques, the scope of the invention should not be so limited. In alternative embodiments, instead of or in addition to accuracy, other variables can also be used to categorize network traffic content. For example, in other embodiments, a weight value or factor can be associated with a result of a technique. The weight value can represent a characteristic of an analysis method, such as, usage frequency (e.g., higher weight value can be assigned to an analysis method that has a higher usage frequency, and vice versa), complexity of analysis technique (e.g., higher weight value can be assigned to analysis technique that is more advanced or complex), or update frequency (e.g., higher weight value can be assigned to analysis technique for which parameters for characterizing content are updated relatively more frequent). Also, in other embodiments, more than one weight factors for each technique are used. In accordance with another aspect of the invention, a memory is provided for storing accuracy value(s) and/or weight value(s) for each of the technique(s). The memory can be a disk, a computer hard drive, a server, or any device capable of storing electronic information. Such memory can be a component of module 110, a component that is configured to integrate with module 110, or a component that is coupled to module 110 via a communication link (wire or wireless).

As illustrated by the above examples, each of the techniques contributes to a final decision of content categorization. By using more than one technique (e.g., ILA, ELA, MTA, TKA) to characterize network traffic content, user 104 can obtain a more accurate content categorization (because one analysis technique may be more accurate than another). Also, including accuracy and/or weight value(s) associated with a technique result in a content categorization process is advantageous because they account for a quality and/or nature of the content categorization, thereby rendering the categorization result more accurate. In some cases, if the final decision is non-conclusive (e.g., result does not meet prescribed criteria for categorizing content), the content will be flagged and be sent to an operator for manual verification.

Although embodiments of module 110 and process 200 have been described with reference to categorizing Web content, it should be understood that the same or similar methods and modules may also be used to categorize other content, such as FTP, public server addresses, emails, telnet data, instant messenger data, SSH data, SFTP data, and any electronic information. In some embodiments, module 110 includes a protocol differentiator (not shown), which examines headers of the network traffic and determines the types of content being screened. Module 110 then analyzes content using prescribed analysis method(s) (e.g., ILA) for the type of content. For example, if it is determined that the network traffic content is Web content, then all four techniques (ILA, ELA, MTA, TKA) can be used to analyze the content. On the other hand, if it is determined that the network traffic content is an email, then only TKA, for example, is used to analyze the content. In some embodiments, each type of network traffic content is pre-assigned to a port of a network gateway by a default configuration. For example, HTTP, SMTP, POP, IMAP, and FTP data may each be pre-assigned to be transmitted through a designated port. In such case, protocol differentiator can determine a type of content based on an identification of a port transmitting the network content. In other embodiments, protocol differentiator can be configured to scan all available ports in order to determine a type of the network traffic content being screened.

Also, in other embodiments, instead of, or in addition to, determining a categorization of network traffic content, module 110 can be configured to control flow of network traffic content based on a determined characteristic of the network traffic content. For example, module 110 can be configured to block HTTP request, thereby preventing undesirable content, such as a Web page containing undesirable content, from being transmitted to user 104. In other cases, module 110 may erase network traffic content, or modify network traffic content based on a determined characteristic of the network traffic content, such that only portion(s) of the content is allowed to pass to user 104.

In some embodiments, a user interface can be provided that allows user 104 to select criteria or parameters for categorizing network traffic content. For example, module 110 can allow user 104 to set threshold(s) (e.g., minimum accuracy required before it should be considered), select weight values to be considered in a content categorization process, and designate number of categories for each content (sometimes a content can be categorized as belonging to more than one categories). Also, in other embodiments, the module 110 can allow user 104 to select which technique(s) (e.g., ILA, ELA, etc.) to use for a certain type of network content, and how result(s) of technique(s) is to be processed.

Computer Architecture

Figure 7:
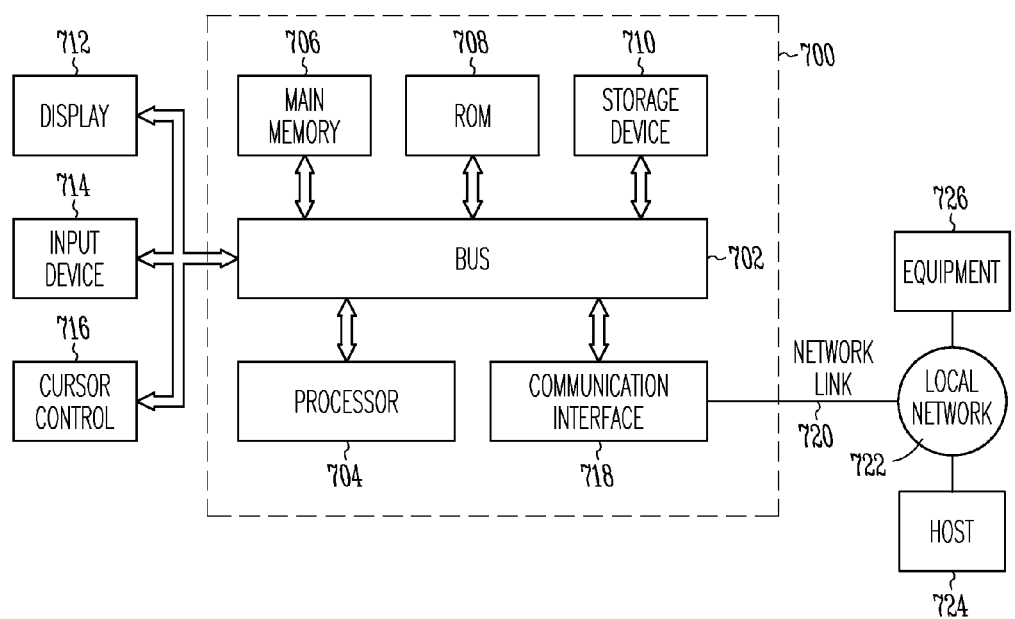
FIG. 7 is a diagram of a computer hardware system with which embodiments of the present invention can be implemented.

As described previously, module 110 can be implemented using software, hardware, or combination therefore. However, those skilled in the art understand that a computer system may also be used to implement module 110 to perform the functions described herein. FIG. 7 is a block diagram that illustrates an embodiment of a computer system 700 upon which embodiments of the method 200 may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 may further include a read only memory (ROM) 708 or other static storage device coupled to bus 702 for storing static information and instructions for processor 704. A data storage device 710, such as a magnetic disk or optical disk, is provided and coupled to bus 702 for storing information and instructions.

Computer system 700 may be coupled via bus 702 to a display 712, such as a cathode ray tube (CRT), for displaying information to user 104. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 can be used for processing network traffic content. According to some embodiments, such use may be provided by computer system 700 in response to processor 704 executing one or more sequences of one or more instructions contained in the main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement embodiments described herein. Thus, embodiments described herein are not limited to any specific combination of hardware circuitry and software.

The term "computer-readable medium" as used herein refers to any medium that participates in providing instructions to processor 704 for execution. Such a medium may take many forms, including but not limited to, non-volatile media, and volatile media. Non-volatile media includes, for example, optical or magnetic disks, such as storage device 710. Volatile media includes dynamic memory, such as main memory 706.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry data streams representing various types of information.

Network link 720 typically provides data communication through one or more networks to other devices. For example, network link 720 may provide a connection through local network 722 to a host computer 724. Network link 720 may also transmits data between an equipment 726 and communication interface 718. The data streams transported over the network link 720 can comprise electrical, electromagnetic or optical signals. The signals through the various networks and the signals on network link 720 and through communication interface 718, which carry data to and from computer system 700, are exemplary forms of carrier waves transporting the information. Computer system 700 can send messages and receive data, including program code, through the network (s), network link 720, and communication interface 718. Although one network link 720 is shown, in alternative embodiments, communication interface 718 can provide coupling to a plurality of network links, each of which connected to one or more local networks. In some embodiments, computer system 700 may receive data from one network, and transmit the data to another network. Computer system 700 may process and/or modify the data before transmitting it to another network.

Although particular embodiments have been shown and described, it will be understood that it is not intended to limit the present inventions to the preferred embodiments, and it will be obvious to those skilled in the art that various changes and modifications may be made without departing from the spirit and scope of the present inventions. For example, in other embodiments, one or more functions performed by module 110 may be implemented using one or more processors or one or more software. Also, in alternative embodiments, module 110 needs not perform all of the steps in FIG. 2. For example, in other embodiments, module 110 does not analyze content data (i.e., does not perform Step 202), but receives results of analysis from a source. In such cases, based on results of analysis received, module 110 then categorize network traffic content based on accuracies of the results. The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed is:

1. A method of categorizing network traffic content comprising:
    receiving, via a network interface device, network traffic content from a network in a network traffic content categorization module;
    performing, through execution of instructions on a processor, analysis on the network traffic content within the network traffic content categorization module according to at least one analysis technique to obtain at least one categorization of the network traffic content and a probability of accuracy of each of the at least one categorizations, the at least one analysis performed as a function of a database of known categorization properties of network traffic content;
    storing, on a data storage device, by the network traffic content categorization module, a representation of the categorization and data derived from the network traffic content; and
    categorizing subsequently received network traffic content according to the at least one analysis technique as a function of the stored representation of the categorization when the probability of accuracy at least meets an accuracy threshold.

2. The method of claim 1, wherein storing the representation of the categorization and data derived from the network traffic content includes storing the representation in the database of known categorization properties of network traffic content.

3. The method of claim 1, wherein the network traffic content comprises text-based chat messages.

4. The method of claim 3, wherein the text-based chat messages are instant messages.

5. The method of claim 1, wherein the network traffic content comprises content received over a network according to the Hypertext Transport Protocol and an email protocol.

6. The method of claim 1, wherein performing analysis on the network traffic content includes performing at least one of an internal link analysis, an external link analysis, a meta tag analysis, and a token analysis.

7. The method of claim 1, wherein the network traffic content categorization module receives a copy of the network traffic content to build a database of categorized network traffic content and a network traffic content screening module screens network traffic content destined for users according to the database of categorized network traffic content.

8. A method of screening network traffic content comprising:
    receiving, via a network interface device, network traffic content from a network in a network traffic content screening module;
    performing, through execution of instructions on a processor, analysis on the network traffic content screening module according to at least one analysis technique to obtain at least one categorization of the network traffic content and a probability of accuracy of the at least one categorization, the at least one analysis performed as a function of a database of known categorization properties of network traffic content;
    determining, through execution of instructions on a processor, based on the at least one categorization of the network traffic content and the probability of accuracy of the at least one categorization, whether the network traffic content is undesirable content;
    when the network traffic content is undesirable content and the probability of accuracy at least meets an accuracy threshold, preventing the undesirable content from reaching its destination; and
    otherwise allowing the network traffic content to pass.

9. The method of screening network traffic content of claim 8, the method further comprising:
    storing, on a data storage device, by the network traffic content categorization module, a representation of the at least one categorization, the probability of accuracy of the at least one categorization, and data derived from the network traffic content;

providing a view of the stored representation of the at least one categorization; and receiving input verifying an accuracy of the stored representation of the at least one categorization.

10. The method of claim 8, further comprising:

passing a copy of the network traffic content to a network traffic content categorization module to build a database of known network traffic content categorizations according to the at least one categorization.

11. The method of claim 8, wherein the network traffic content comprises text-based chat messages.

12. The method of claim 8, wherein the network traffic content comprises content received over a network according to the Hypertext Transport Protocol and an email protocol.

13. The method of claim 8, wherein performing analysis on the network traffic content includes performing at least one of an internal link analysis, an external link analysis, a meta tag analysis, and a token analysis.

14. A non-transitory machine-readable storage medium, with instructions thereon which when executed by a processor of a machine, causes the machine to screen network traffic content by:

receiving network traffic content in a network traffic content screening module;

performing analysis on the network traffic content within the network traffic content screening module according to at least one analysis technique to obtain at least one categorization of the network traffic content and a probability of accuracy of each of the at least one categorizations, the at least one analysis performed as a function of a database of known categorization properties of network traffic content;

determining, through execution of instructions on a processor, based on the at least one categorization of the network traffic content and the probability of accuracy of the at least one categorization, whether the network traffic content is undesirable content;

when the network traffic content is undesirable content and the probability of accuracy at least meets an accuracy threshold, preventing the undesirable content from reaching its destination; and otherwise allowing the network traffic content to pass.

15. The non-transitory machine-readable storage medium of claim 14, wherein the instructions when further executed, cause the machine to:

pass a copy of the network traffic content to a network traffic content categorization module to build a database of known network traffic content categorizations according to the at least one categorization.

16. The non-transitory machine-readable storage medium of claim 14, wherein the network traffic content comprises text-based chat messages.

17. The non-transitory machine-readable storage medium of claim 14, wherein the network traffic content comprises content received over a network according to the Hypertext Transport Protocol and an email protocol.

18. The non-transitory machine-readable storage medium of claim 14, wherein performing analysis on the network traffic content includes performing at least one of an internal link analysis, an external link analysis, a meta tag analysis, and a token analysis.

* * * * *